United States Patent [19]
de Mersseman et al.

[11] Patent Number: 5,779,264
[45] Date of Patent: Jul. 14, 1998

[54] CRASH DETECTOR ARRANGEMENT

[75] Inventors: Bernard de Mersseman, Varene Saint Hillaire; Philippe Aubertin, Jouy le Montier, both of France

[73] Assignee: Sagem-Autoliv, Paris, France

[21] Appl. No.: 798,167

[22] Filed: Feb. 10, 1997

[51] Int. Cl.$^6$ .................................................. B60R 21/32
[52] U.S. Cl. .................. 280/735; 364/424.05; 307/10.1; 340/436
[58] Field of Search ................................. 280/735, 734; 364/424.05; 307/10.1; 340/436

[56] References Cited

U.S. PATENT DOCUMENTS

| | | | |
|---|---|---|---|
| 5,436,838 | 7/1995 | Miyamori | 364/424.05 |
| 5,546,307 | 8/1996 | Mazur et al. | 364/424.05 |
| 5,587,906 | 12/1996 | McIver et al. | 280/735 X |
| 5,608,628 | 3/1997 | Drexler et al. | 280/734 X |
| 5,620,202 | 4/1997 | Gray et al. | 280/735 |
| 5,631,834 | 5/1997 | Tsurushima et al. | 364/424.05 |

Primary Examiner—Christopher P. Ellis
Attorney, Agent, or Firm—Spencer & Frank

[57] ABSTRACT

A crash detector arrangement comprises a crash sensor(1) in the form of an accelerometer which provides a signal to a micro-processor(2) which uses a first algorithm to determine if the signal is representative of a crash of a predetermined severity and which consequently provides an output(8) rendering a first switch(9) conductive. The output of the accelerometer(1) is provided also to the micro-processor(2) through a high pass filter. This input to the micro-processor is processed by another, different, algorithm determined to differentiate a crash from a signal error in the accelerometer. A second output(7) is generated by the micro-processor which is used to assist in the control of a further switch(13). The two switches(9,13) are in a series connection incorporating a source of power(10) and a resistor(12). When current passes through the resistor, the safety device is activated. The second output(7) of the micro-processor(2) passes through an AND-gate(6) which also receives an input from a threshold detector(4) and from a check circuit(14).

20 Claims, 2 Drawing Sheets

CRASH DETECTOR ARRANGEMENT

BACKGROUND OF THE INVENTION

THE PRESENT INVENTION relates to a crash detector arrangement to activate a safety device, and more particularly relates to a crash detector arrangement provided in a motor vehicle which is adapted to activate a safety device such as an air-bag or a seat-belt pre-tensioner.

It has been proposed previously to provide crash detector arrangements in motor vehicles adapted to activate a safety devices such as, for example, an air-bag or a pre-tensioner.

It has been proposed previously to activate the safety device by passing an electric current through a resistor or squib, which becomes heated as a consequence of the flow of electric current, thus igniting a pyrotechnic charge. It has also been proposed to connect such a resistor or squib in a series connection with two switches. One switch may be controlled by an accelerometer or other device which is responsive to a crash situation. The other switch is controlled by a "safing sensor" which responds to an appropriate input. The series connection of the two switches and the squib extends between a power supply and earth. It is only when both of the two switches are closed that a current can flow to activate the squib.

One advantage of the prior proposed arrangements is that if an error occurs in the accelerometer, thus inadvertently closing the switch controlled by the accelerometer, the squib will not be activated, provided that the switch controlled by the safing sensor is open It is, however, difficult to select an appropriate parameter to control the safing sensor. If the safing sensor senses, for example, motion of the vehicle or is activated whenever the ignition of the vehicle is switched on, then any error that occurs within the accelerometer during operation of the vehicle will result in the pyrotechnic device activated by the squib being ignited, thus deploying the safety device.

SUMMARY OF THE INVENTION

According to this invention there is provided a crash detector arrangement adapted to activate a safety device, the arrangement comprising a power supply connected to a series connection of a first switch, an actuator for activating the safety device and a second switch, the arrangement further comprising a crash sensor providing a signal, processing means adapted to process the said signal in accordance with a first predetermined algorithm to provide a first output signal to render the first switch conductive, and processing means adapted to process a further signal from the crash sensor in accordance with a second algorithm to provide a second output signal to render the second switch conductive, the two algorithms being different, the further signal being derived by passing the output of the crash sensor through a high-pass filter, each algorithm being adapted to distinguish a signal from the crash sensor due to a crash having predetermined characteristics from a signal from the crash sensor due to other causes, so that the first output signal and the second output signal are each provided in response to a crash having said predetermined characteristics said processing means being adapted to process the further signal and comprising means to determine the number of times the output of the high-pass filter passes predetermined threshold levels in a predetermined period of time and, in response to the number of passings exceeding a predetermined number, to provide said second output signal to render the second switch conductive.

Preferably the first algorithm is adapted to distinguish a crash of at least a predetermined severity from a crash less than the predetermined severity.

Preferably the second algorithm is adapted to distinguish a crash of any severity from an error signal originating in the crash sensor.

Preferably the crash sensor is an accelerometer providing a signal representative of sensed acceleration.

Conveniently the signal from the crash sensor only contains frequencies below a predetermined frequency in the range 300–400 Hz.

Preferably the said first algorithm comprises the step of integrating the said signal from the crash sensor.

The high-pass filter may comprise an analogue filter adapted to pass frequencies above a selected frequency in the range 50–150 Hz. The selected frequency is preferably 100 Hz. Thus the filter acts to pass frequencies within a predetermined band, the lower end of band being in the range 50–150 Hz and the upper end of the band being in the range 300–400 Hz. Conveniently the threshold levels are spaced above and below the origin.

Advantageously the said second switch is responsive also to an additional signal, both the said second output signal and the said additional signal being present before the switch is rendered conductive.

Preferably the said additional signal is derived from the accelerometer by filtering the output of the accelerometer through a high-pass filter and determining that the output of the high-pass filter exceeds a predetermined threshold.

The predetermined threshold level may be equivalent to a sensed acceleration in the range of 3–6 G, such as 4 G.

Preferably the processing means which process one or both of the said signal and the said further signal comprises a micro-processor operating at a sampling frequency of at least 1,500 Hz, such as a sampling frequency of 2,000 Hz.

An arrangement as described above may be adapted and utilised to sense a side impact.

DETAILED DESCRIPTION OF THE INVENTION

Figure 1:
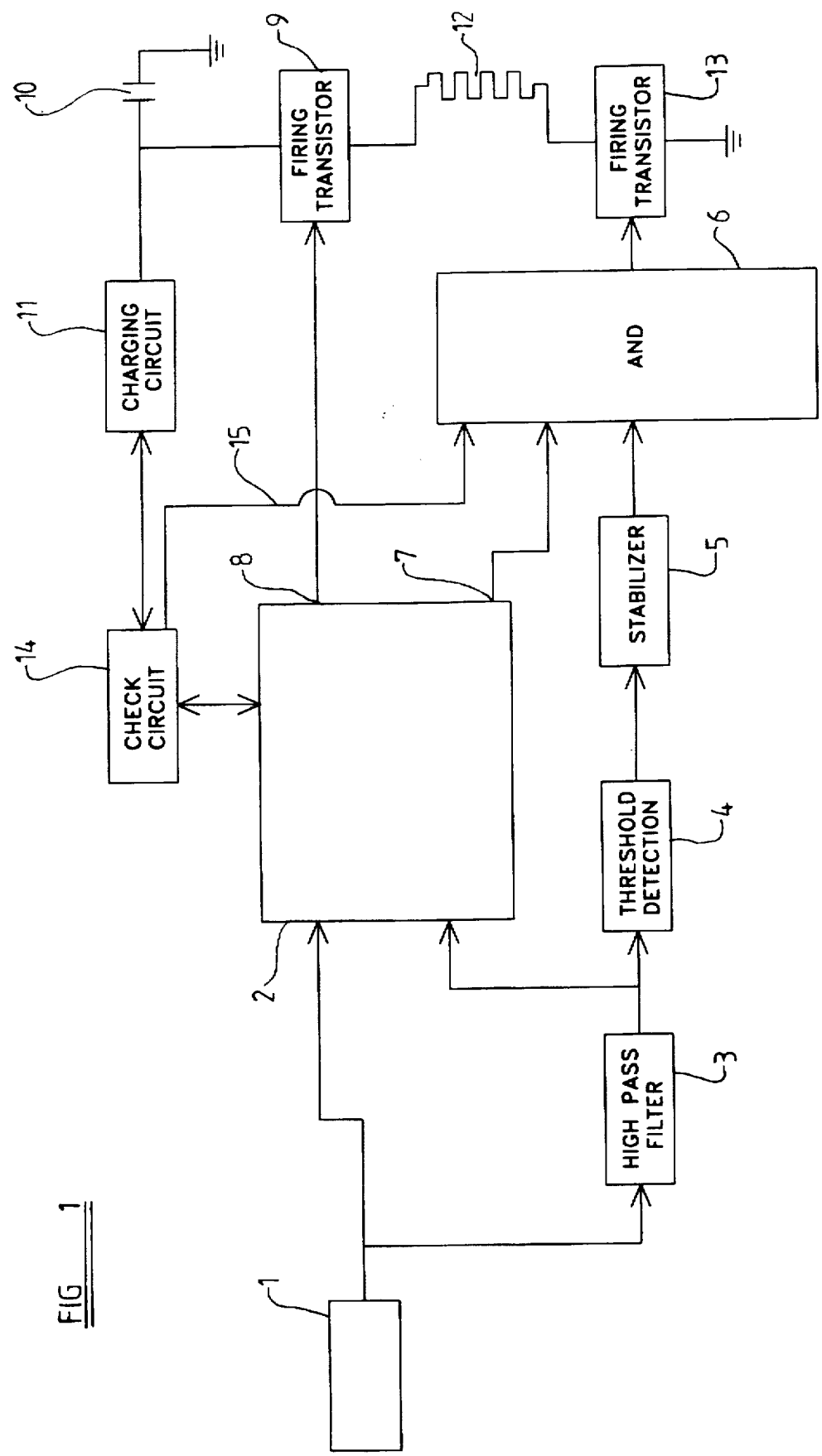
FIG. 1 is a block diagram of one embodiment of the invention.

Referring initially to FIG. 1, a crash detector arrangement which is adapted to activate a safety device is illustrated comprising an accelerometer 1 which provides an analogue output. Typically, the analogue output is within a frequency band having an upper limit in the range of 300–400 Hz. The output of the accelerometer 1 is connected to one input of a micro-processor 2 and also to the input of a high-pass filter 3. The output of the high-pass filter 3, which is typically constrained to be in the frequency band having a lower limit of between 50 and 150 Hz, typically 100 Hz, is applied as a second input to the micro-processor 2, and is also applied as input to a threshold detector 4. The threshold detector is adapted to provide an output whenever the output of the high-pass filter exceeds a predetermined threshold, that threshold corresponding, for example, to a sensed deceleration in the range of 3 to 6 G—typically 4 G.

The output of the threshold detector is provided to a stabiliser or delay circuit 5. Whenever the stabiliser or delay circuit 5 receives an input from the threshold detector 4, the stabiliser or delay circuit 5 provides an output which has a duration of at least 28 mS. The output of circuit 5 is applied to one input of a AND-gate 6.

The micro-processor 2 has a first output 7 which is connected to another input of the AND-gate 6 and has a second output 8 which is connected to the control electrode of a firing transistor 9, which acts as a switch. The firing transistor 9 is present in a series connection between a capacitor 10 which is associated with a charging circuit 11, a resistor or squib 12 and a further firing transistor 13, which also acts as a switch and earth. The output of the AND-gate 6 is connected to the control electrode of the firing transistor 13. The resistor or squib 12 is associated with a pyrotechnic charge which, when activated, deploys a safety device such as an air-bag or safety-belt pre-tensioner.

A check circuit 14 is provided. The check circuit 14 is connected to the charging circuit 11 and checks if the charging circuit is functioning correctly. The check circuit 14 is also connected to the micro-processor 2 and is adapted to check that the microprocessor 2 is functioning correctly. The check circuit 14 is provided with an output 15 which is connected as an enabling input to the AND-gate 6. Consequently, the AND-gate 6 will only pass a signal when enabled by the check circuit 14 and when provided with appropriate signals on the first output 7 of the micro-processor 2 and by the output of the stabiliser or delay circuit 5.

At this stage it is to be appreciated that the capacitor 10 is usually maintained in a charged condition by the charging circuit 11. If appropriate signals are applied to the control electrodes of the firing transistor 9 and the firing transistor 13 simultaneously, the two transistors become conductive and the charge present on the capacitor 10 is discharged through the firing transistor 9, the resistor or squib 12 and the firing transistor 13. The resultant flow of current through the squib 12 ignites the pyrotechnic charge which is associated with the resistor or squib 12, thus deploying the safety device, such as an air-bag or a safety-belt pre-tensioner.

The micro-processor is provided with analogue to digital converters associated with each input and digital to analogue converters associated with each output. Thus the micro-processor receives and emits analogue signals, but operates in a digital manner.

The micro-processor is adapted to sample the unfiltered signal that is supplied to the micro-processor 2 from the accelerometer 1 with a sampling frequency of at least 1,500 Hz, the sampling frequency preferably being 2,000 Hz. The sampled signal is processed by a first appropriate algorithm to determine if the sample signal is or is not representative of a crash of at least a predetermined severity. Thus, the algorithm is adapted to respond to a crash of at least a predetermined severity by generating an output, but will not respond, for example, to a signal representative of a crash of less than the predetermined severity.

The first algorithm may take any appropriate form. For example, the sampled signal may be integrated, and the integrated signal may be compared with one or more pre-determined signals which are stored in an appropriate memory forming part of the micro-processor, the micro-processor determining that a crash is occurring when the integrated sampled signal is a close match with at least one of the stored signals.

When the micro-processor determines, by processing the signal from the accelerometer with the first algorithm, that a crash of at least a predetermined severity is occurring by analysing the signal applied to the micro-processor directly from the accelerometer, a first output is provided on the output 8 of the micro-processor which is connected to the control electrode of the firing transistor 9, thus rendering that transistor conductive.

Figure 2:
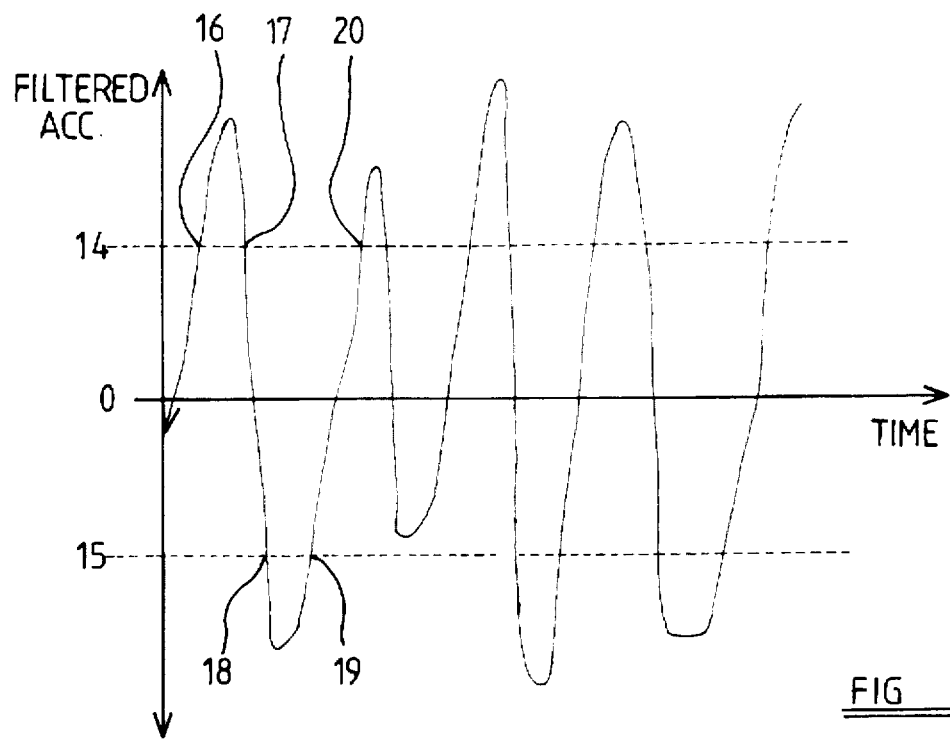
FIG. 2 is a graphical figure illustrating the output of the high-pass filter in a typical crash situation.

The output of the high-pass filter 3 is a further signal originating from the accelerometer in the form of a filtered signal which, in a typical accident situation, has a waveform corresponding to that illustrated in FIG. 2. It is to be observed that the waveform has a plurality of sequential oppositely sensed amplitude peaks which extend beyond predetermined threshold levels 14,15 which are located above and below the line of the origin. The micro-processor is adapted to count the number of times that the waveform crosses the thresholds. It can be seen, from the example given, that the output waveform crosses the thresholds at the point 16,17,18,19,20... and so on. The micro-processor is adapted to respond when the filtered signal from the high-pass filter 3 has passed the threshold lines more than a predetermined number of times, for example, more than four times, within a predetermined brief period of time. The micro-processor is then adapted to generate an output on the output 7 which is connected to the AND-gate 6. Thus, the signal derived from the accelerometer through the high-pass filter is processed with a second algorithm, involving the counting of the number of times that the waveform passes thresholds. This second algorithm is adapted to distinguish a crash of any severity from an error signal originating in the crash sensor. Such an error signal is typically a uniform signal of a predetermined voltage. A signal of this type does not have a waveform that passes successive thresholds.

Both of the algorithms are designed so that each algorithm generates an output signal when a crash having predetermined characteristics occurs.

The output of the high-pass filter 3 is also provided to a threshold detector 4 which senses when the amplitude exceeds a predetermined triggering threshold. This predetermined triggering threshold may correspond, for example, to a sensed deceleration of 4 G, but the sensed deceleration may be anywhere within the range of 3–6 G. The output of the threshold detector is provided to a stabiliser or delay circuit 5 which provides an output pulse of at least 28 mS in response to an output from the threshold detector 4. The output from the stabiliser is provided to the AND-gate 6.

Thus, in the described embodiment, when an accident occurs, the accelerometer 1 senses the deceleration of the vehicle and provides an output signal. This output signal is processed in the micro-processor 2 in accordance with a first algorithm and an output present on the output 8 makes the firing transistor 9 conductive. The filtered output signal from the accelerometer 1 is also processed by the micro-processor 2 in accordance with a second algorithm, and an output is provided on the output 7 from the micro-processor which is supplied to the AND-gate 6. Simultaneously the threshold of the filtered signal is detected and the stabiliser or delay circuit 5 provides an output which comprises an additional signal to the AND-gate 6. At the same time, the check circuit 14 provides a signal on the output 15 confirming that both the charging circuit 11 and the micro-processor 2 are operating correctly. The AND-gate 6 is consequently enabled, and is provided with appropriate input signals and consequently, the AND-gate 6 provides an output which renders the firing transistor 13 conductive, thus enabling the squib 12 to be heated by the flow of current therethrough, consequently igniting the pyrotechnic device which deploys the associated safety device.

The output of the accelerometer may, during certain circumstances when the vehicle is not involved in an accident or crash, be such that when the micro-processor 2 processes the signal in accordance with the first algorithm, an output may be generated at the output 8 which renders the firing transistor 9 conductive. However, in such a situation, the filtered signal, as shown in FIG. 2, must pass the thresholds the predetermined number of times and also the amplitude of the filtered signal must pass the predetermined threshold in order to render the transistor 13 conductive, if the safety device is to be deployed. This is a very unlikely coincidence.

Figure 3:
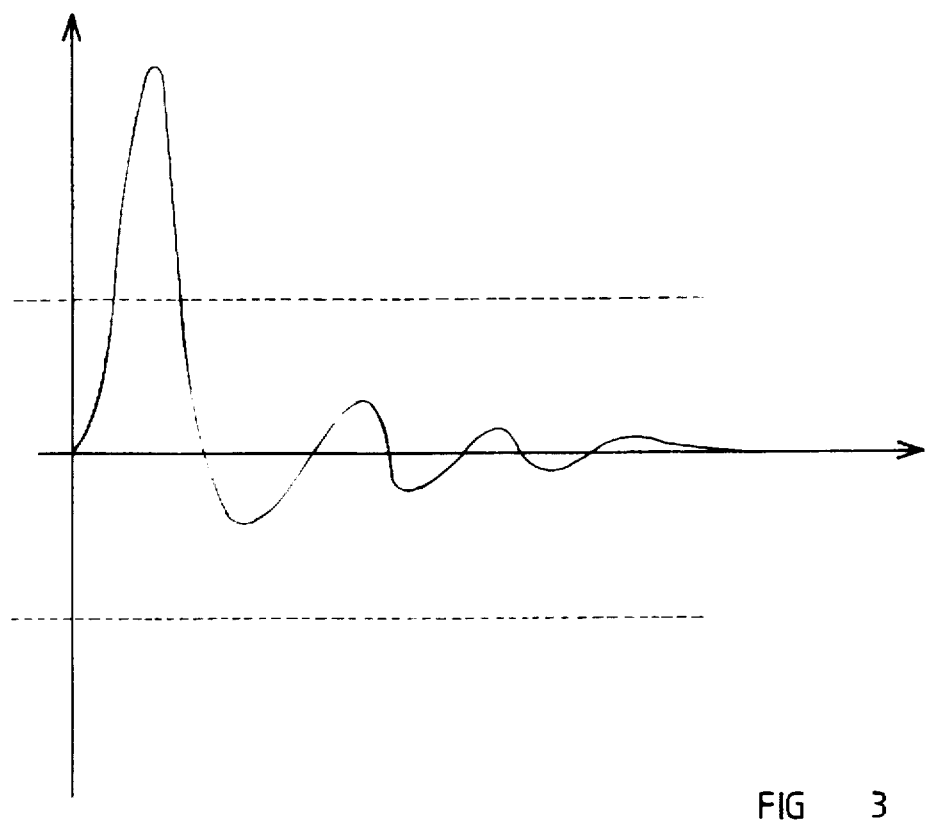
FIG. 3 is a corresponding graphical figure showing the output of the high-pass filter following a failure of the accelerometer.

If the accelerometer should fail, due to breakage of the sensor or element, or an electronic failure, typically the output goes permanently "thigh". Such an output, when filtered, may have the waveform as shown in FIG. 3. It can be seen that this waveform only passes the threshold 14 two times which is not sufficient for an output to be generated by the micro-processor on the output 7.

Consequently, it is to be appreciated that in the described embodiment of the invention one switch in the series connection which incorporates the squib is controlled by a first signal which is generated by the micro-processor processing the output of the accelerometer, a predetermined algorithm, and the second switch is controlled by a second signal, which is also derived from the accelerometer signal, which is processed by means which utilise a second, different algorithm which is capable of distinguishing a signal from the accelerometer due to a crash from a signal derived from the accelerometer due to an error in the accelerometer.

The arrangement described above may be particularly suitable for use in sensing a side impact. When sensing a side impact it is necessary to generate an appropriate response and deploy the appropriate safety device swiftly. A desirable response time may be of the order of 4 or 5 mS. In such a case the safety device may comprise an air-bag which, when inflated, is located between the side of the vehicle and the driver or occupant of the vehicle. The accelerometer may be adapted to sense, directly or indirectly, the acceleration of the outer skin of the door of the vehicle. However, it is to be appreciated that the arrangement described above may be utilised in connection with other sensors.

What is claimed is:

1. A crash detector arrangement adapted to activate a safety device, the arrangement comprising a power supply connected to a series connection of a first switch, an actuator for activating the safety device and a second switch, the arrangement further comprising a crash sensor providing a signal, processing means adapted to process the said signal in accordance with a first predetermined algorithm to provide a first output signal to render the first switch conductive, and processing means adapted to process a further signal from the crash sensor in accordance with a second algorithm to provide a second output signal to render the second switch conductive, the two algorithms being different, the further signal being derived by passing the output of the crash sensor through a high-pass filter, each algorithm being adapted to distinguish a signal from the crash sensor due to a crash having predetermined characteristics from a signal from the crash sensor due to other causes, so that the first output signal and the second output signal are each provided in response to a crash having said predetermined characteristics, said processing means being adapted to process the further signal and comprising means to determine the number of times the output of the high-pass filter passes predetermined threshold levels in a predetermined period of time and, in response to the number of passings exceeding a predetermined number, to provide said second output signal to render the second switch conductive.

2. An arrangement according to claim 1 wherein the first algorithm is adapted to distinguish a crash of at least a predetermined severity from a crash of less than the predetermined severity.

3. An arrangement according to claim 1 wherein the second algorithm is adapted to distinguish a crash of any severity from an error signal originating in the crash sensor.

4. An arrangement according to claim 1 wherein the crash sensor is an accelerometer providing a signal representative of sensed acceleration.

5. An arrangement according to claim 1 wherein the signal from the crash sensor only contains frequencies below a predetermined frequency in the range 300–400 Hz.

6. An arrangement according to claim 1 wherein the said first algorithm comprises the step of integrating the said signal from the crash sensor.

7. An arrangement according to claim 1 wherein the said predetermined number comprises four.

8. An arrangement according to claim 1 wherein the high-pass filter comprises an analogue filter.

9. An arrangement according to claim 1 wherein the filter is adapted to pass frequencies above a selected frequency in the range 50–150 Hz.

10. An arrangement according to claim 9 wherein the selected frequency is 100 Hz.

11. An arrangement according to claim 1, wherein the said threshold levels are spaced above and below the origin.

12. An arrangement according to claim 1 wherein the said second switch is responsive also to an additional signal, both the said second output signal and the said additional signal being present before the switch is rendered conductive.

13. An arrangement according to claim 12 wherein the said additional signal is derived from the accelerometer by filtering the output of the accelerometer through a high-pass filter and determining that the output of the high-pass filter exceeds a predetermined threshold.

14. An arrangement according to claim 13 wherein the said predetermined threshold is equivalent to a sensed acceleration in the range of 3–6 G.

15. An arrangement according to claim 14 wherein the said predetermined threshold is equivalent to a sensed acceleration of 4 G.

16. An arrangement according to claim 1 wherein the processing means which process the said signal comprises a micro-processor operating at a sampling frequency of at least 1,500 Hz.

17. An arrangement according to claim 16 wherein the sampling frequency is 2,000 Hz.

18. An arrangement according to claim 1 wherein the processing means which process the said further signal comprises a micro-processor operating at a sampling frequency of at least 1,500 Hz.

19. An arrangement according to claim 18 wherein the sampling frequency is 2,000 Hz.

20. An arrangement according to claim 1 adapted to sense a side impact.

* * * * *

UNITED STATES PATENT AND TRADEMARK OFFICE
CERTIFICATE OF CORRECTION

PATENT NO. : 5,779,264
DATED : July 14, 1998
INVENTOR(S) : Bernard de MERSSEMAN and Philippe AUBERTIN It is certified that error appears in the above-identified patent and that said Letters Patent is hereby corrected as shown below:

On the title page;

Add - -[30] Foreign Application Priority Data
February 13, 1996 [GB] United Kingdom...9602882.4- -;

add to "[56] References cited, U.S. Patent Documents:"

- -5,181,011  1/1993  Okano
  5,182,459  1/1993  Okano et al.
  5,431,441  7/1995  Okano- -; and add to "[56] References cited, Foreign Patent Documents:"

- -1368915   10/1974  United Kingdom
  0444866    9/1991   European Patent Office
  95-02828   1/1995   WIPO- -.

Signed and Sealed this

Seventeenth Day of November, 1998

Attest:

BRUCE LEHMAN

Attesting Officer

Commissioner of Patents and Trademarks